(12) United States Patent
Zeng et al.

(10) Patent No.: US 11,906,885 B1
(45) Date of Patent: Feb. 20, 2024

(54) FOLDING HANDLE MECHANISM

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 17/873,811

(22) Filed: Jul. 26, 2022

(51) Int. Cl.
*G03B 17/56* (2021.01)

(52) U.S. Cl.
CPC .................. *G03B 17/563* (2013.01)

(58) Field of Classification Search
CPC ............... F16M 13/04; G03B 17/563
See application file for complete search history.

(56) References Cited

U.S. PATENT DOCUMENTS

| | | | | |
|---|---|---|---|---|
| 4,474,439 | A * | 10/1984 | Brown | F16M 11/10 396/428 |
| 5,721,997 | A * | 2/1998 | Powell | F16M 11/28 396/428 |
| 9,389,490 | B2 * | 7/2016 | Esarey | F16M 13/02 |
| 2015/0201113 | A1 * | 7/2015 | Wood | F16M 13/04 348/376 |
| 2021/0373417 | A1 * | 12/2021 | Iritani | G03B 17/563 |
| 2021/0405512 | A1 * | 12/2021 | Nguyen | F16M 11/242 |

FOREIGN PATENT DOCUMENTS

CN 207010766 U * 2/2018

OTHER PUBLICATIONS

Building a Low-Budget Handheld Rig for the Blackmagic Pocket Cinema Camera 4K, The Beat article by McGregor dated Jul. 2019 at <https://www.premiumbeat.com/blog/low-budget-handheld-rig-blackmagic-pocket-cinema-camera-4k/>, Archive.org copy dated Oct. 27, 2020 (Year: 2019).*

* cited by examiner

*Primary Examiner* — Leon W Rhodes, Jr.
(74) *Attorney, Agent, or Firm* — Loza & Loza, LLP; Derek Yeung

(57) ABSTRACT

A handle mechanism includes a front grip and a rear grip, wherein the rear grip is hinged with the front grip, and the rear grip is provided with a mounting assembly for mounting the rear grip on a side of an external photographic device. The front grip and the rear grip can be rotated and fitted together so as to be used as a handle of the external photographic device. The handle mechanism serves as a desktop support, and the front grip and the rear grip can be rotated and unfolded to form a V-shaped support to support the external photographic device. The handle mechanism may be configured as a handle and a support. Compared with a handle and a support that are independent, the handle mechanism is more convenient to carry and use, and has a lower use cost.

8 Claims, 6 Drawing Sheets

FOLDING HANDLE MECHANISM

TECHNICAL FIELD

The product relates to the technical field of cameras, and in particular, to a folding handle mechanism.

INTRODUCTION

At present, in the field of photography, a common handle is mainly used as a mechanism for assisting the handling of the photographic device (e.g., camera), and generally not used as a support mechanism. Therefore, the handle and the support mechanism are two independent devices, which are not only troublesome to replace during use, but also inconvenient to carry, and have a higher cost.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

An object of the present disclosure is to provide a folding handle mechanism. The folding handle mechanism can be used as both a handle and a support for an external photographic device, which is more convenient to carry and use, and has a lower use cost.

In one aspect, a folding handle mechanism includes a front grip and a rear grip, wherein the rear grip is hinged with the front grip, and the rear grip is provided with a mounting assembly for mounting the rear grip on a side of an external photographic device. When the handle mechanism is configured to be hand-held, the front grip and the rear grip are rotated and fitted together, so as to be used as a handle of an external photographic device; when the handle mechanism serves as a desktop support, the front grip and the rear grip are rotated and unfolded to form a V-shaped support to support the external photographic device. That is, the handle mechanism may be used as both a handle and a support. Compared with a handle and a support that are independent devices, the disclosed handle mechanism is more convenient to carry and use, and has a lower use cost.

In one aspect, a side of the rear grip provides a mounting surface configured to be fitted to the side of the external photographic device.

In one aspect, the mounting assembly includes a mounting screw (one or more), the mounting screw is movably provided on the rear grip, and one end of the mounting screw penetrates the rear grip to protrude from the mounting surface. One end of the mounting screw extending from the mounting surface is connected to the external photographic device so that the handle mechanism is mounted and secured on the external photographic device.

In one aspect, a damping structure is provided at a hinge between the rear grip and the front grip. The arrangement of the damping structure enables the front grip and the rear grip to have opposite damping forces (e.g., canceling forces) when they are folded.

In one aspect, the handle mechanism further includes a hinge shaft for the hinge between the front grip and the rear grip; a top end of a rear side of the rear grip extends to form a rear grip hinge part, and the rear grip hinge part is provided with a first hinge hole; a top end of a front side of the front grip extends to form two front grip hinge parts, a hinge cavity is formed between the two front grip hinge parts, each of the two front grip hinge parts is provided with a second hinge hole, the rear grip hinge part extends into the hinge cavity, and the hinge shaft sequentially penetrates the second hinge hole of one of the two front grip hinge parts, the first hinge hole of the rear grip hinge part, and the second hinge hole of the other of the two front grip hinge parts; the damping structure may be a gasket or washer, the gasket is provided in the hinge cavity, and two sides of the gasket are respectively abutted against a side of the rear grip hinge part and a side of the front grip hinge part.

In one aspect, the damping structure may include two gaskets or washers, and the hinge shaft sequentially penetrates the second hinge hole of one of the front grip hinge parts, one of the gaskets, the first hinge hole of the rear grip hinge part, the other of the gaskets and the second hinge hole of the other of the front grip hinge parts.

In one aspect, a rear surface of the front grip is provided with a front grip rubber pad, and a front surface of the rear grip is provided with a rear grip rubber pad. The arrangement of the front grip rubber pad and the rear grip rubber pad makes the front grip and the rear grip more comfortable and secure to hold.

In one aspect, the front side of the front grip is provided with an accommodating groove, and when the rear grip and the front grip are relatively rotated to be fitted together, such that at least a portion of the rear side of the rear grip is accommodated in the accommodating groove.

The present disclosure has the advantage that when the handle mechanism needs to be hand-held, the front grip and the rear grip can be rotated and fitted together, so as to be used as a handle of an external photographic device; when the handle mechanism serves as a desktop support, the front grip and the rear grip are rotated and unfolded to form a V-shaped support to support the external photographic device. That is, the handle mechanism may be used as both a handle and a support. Compared with a handle and a support that are independent, the handle mechanism is more convenient to carry and use, and has a lower use cost.

These and other aspects of the disclosure will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various examples discussed herein. In similar fashion, while exemplary implementations may be discussed below as apparatus, device, system, or method implementations, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1:
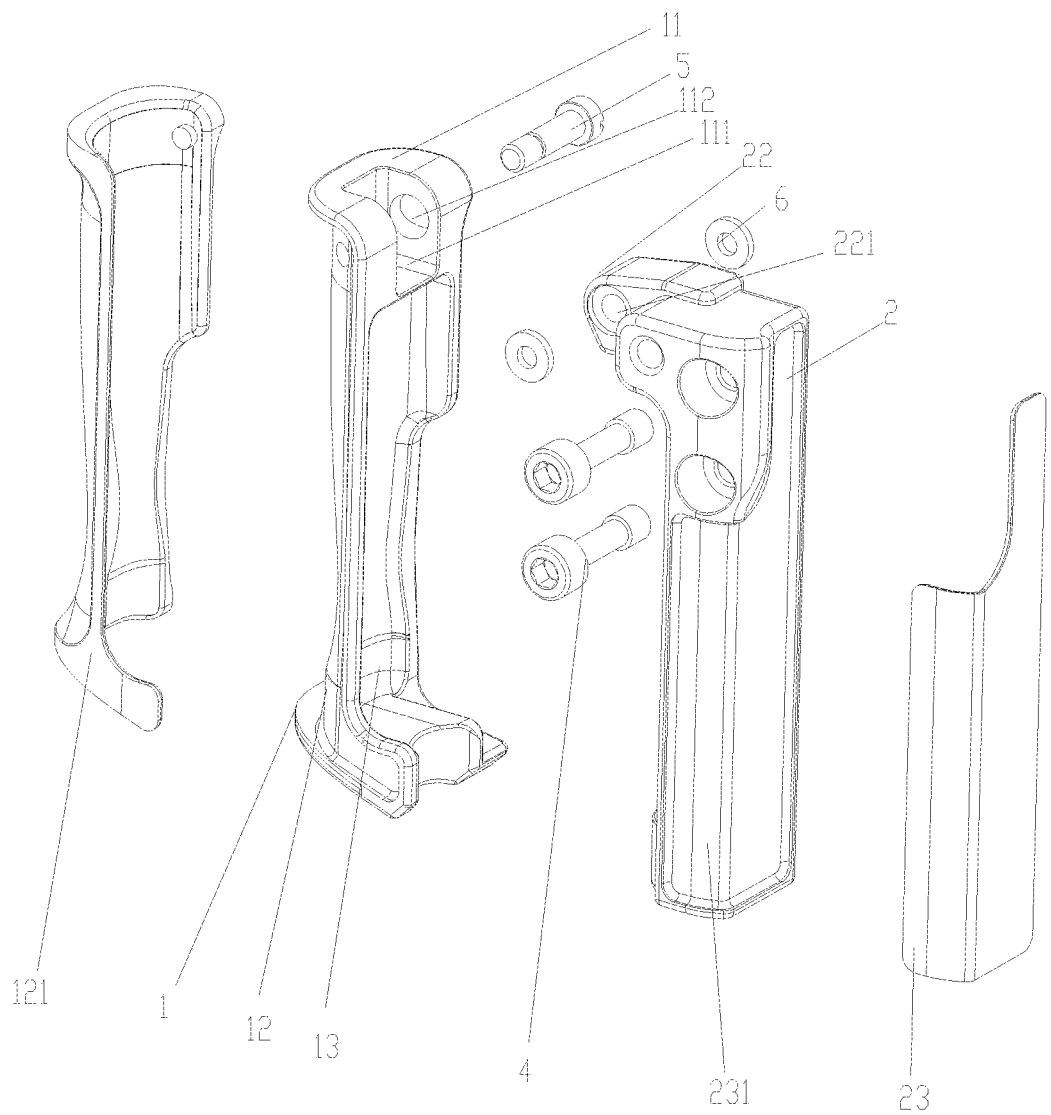
FIG. 1 is an exploded view of the present disclosure.
Figure 2:
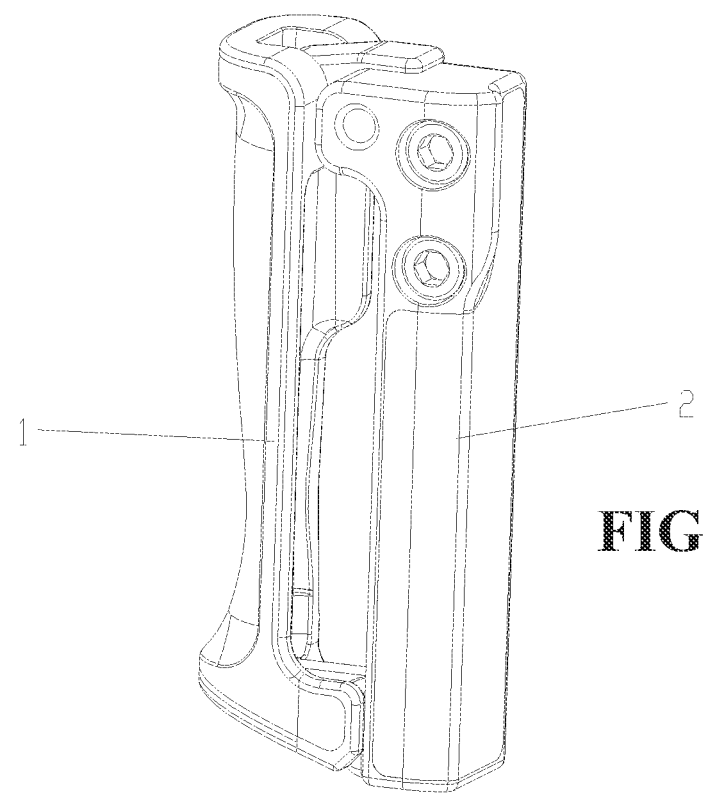
FIG. 2 is a structural schematic diagram of the front grip and the rear grip after being folded.
Figure 3:
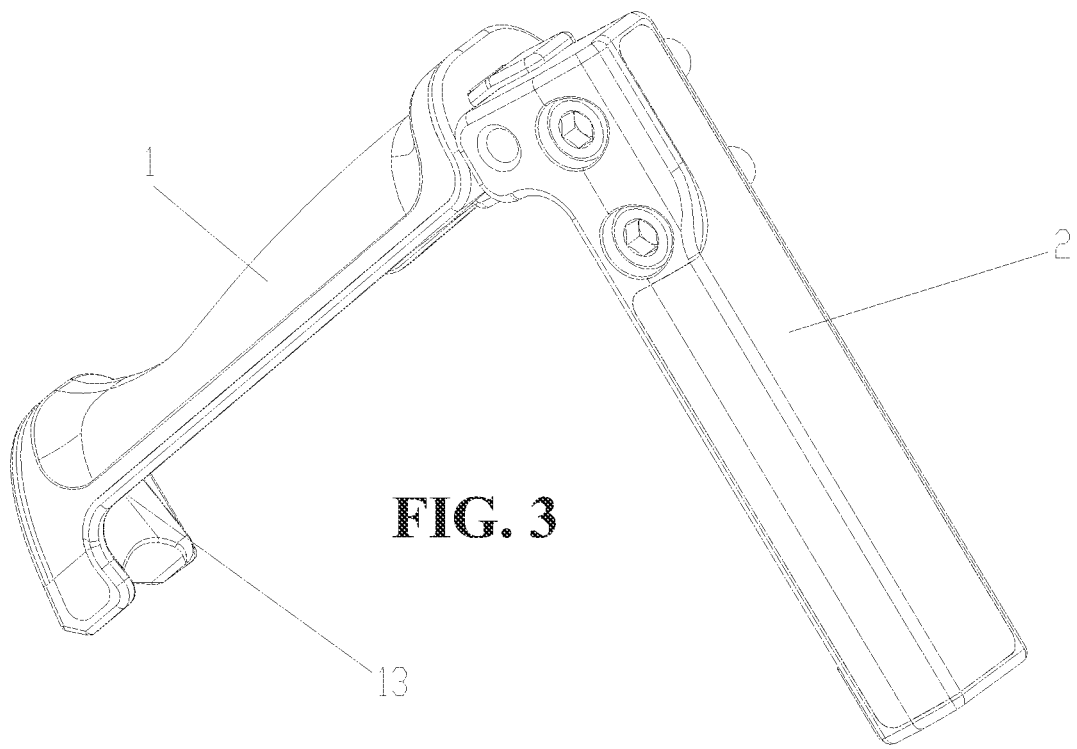
FIG. 3 is a structural schematic diagram of the front grip and the rear grip after being unfolded.
Figure 4:
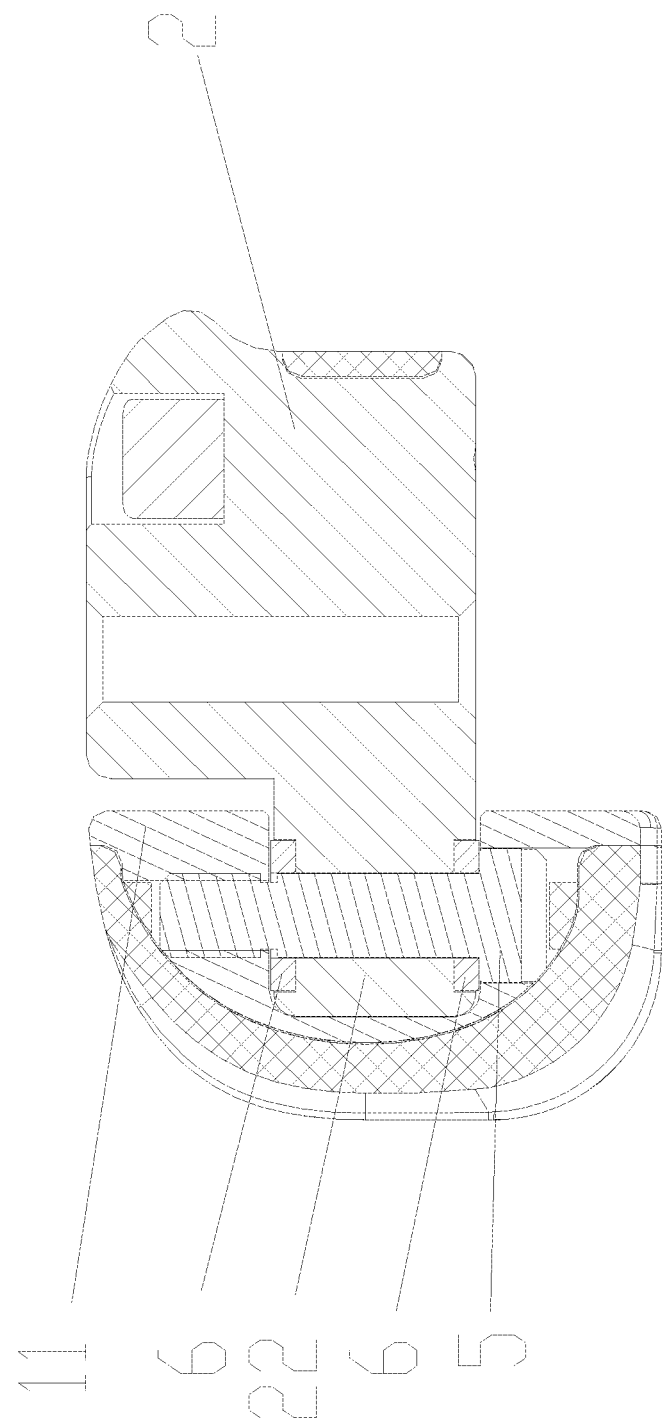
FIG. 4 is a sectional view of the present disclosure.
Figure 5:
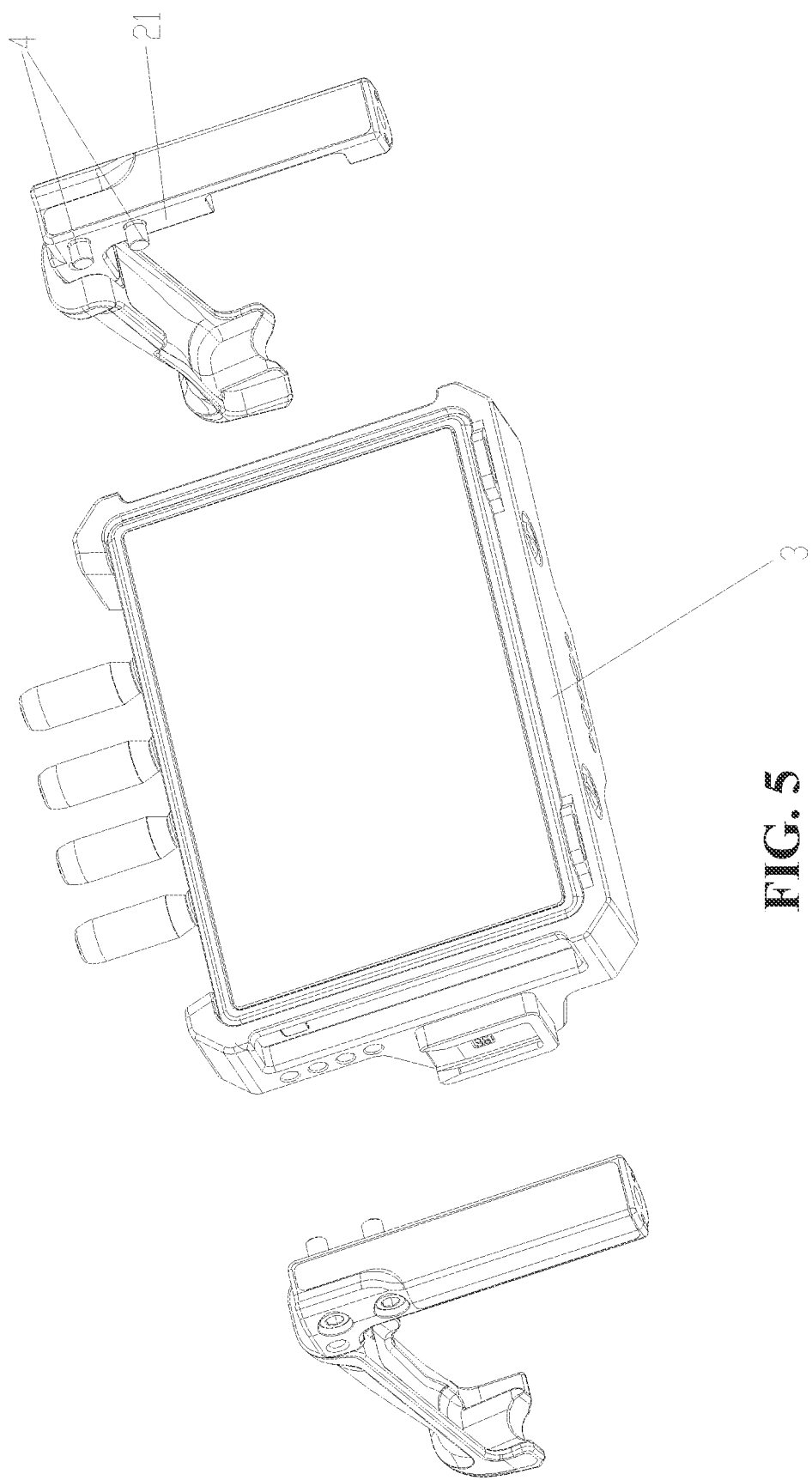
FIG. 5 is an exploded view of the handle mechanism and an external photographic device.
Figure 6:
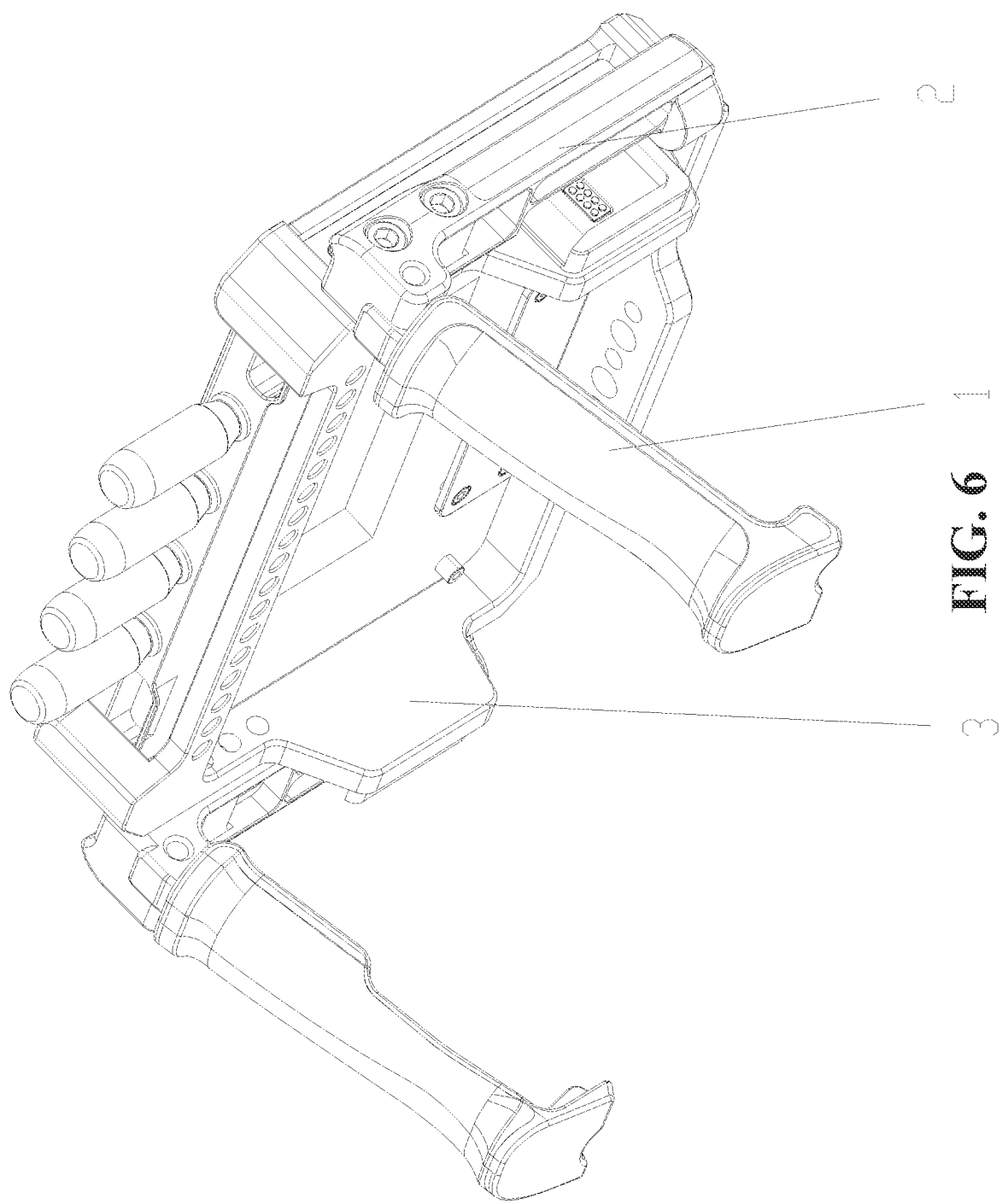
FIG. 6 is a structural schematic diagram of the handle mechanism mounted on an external photographic device after being unfolded.
Figure 7:
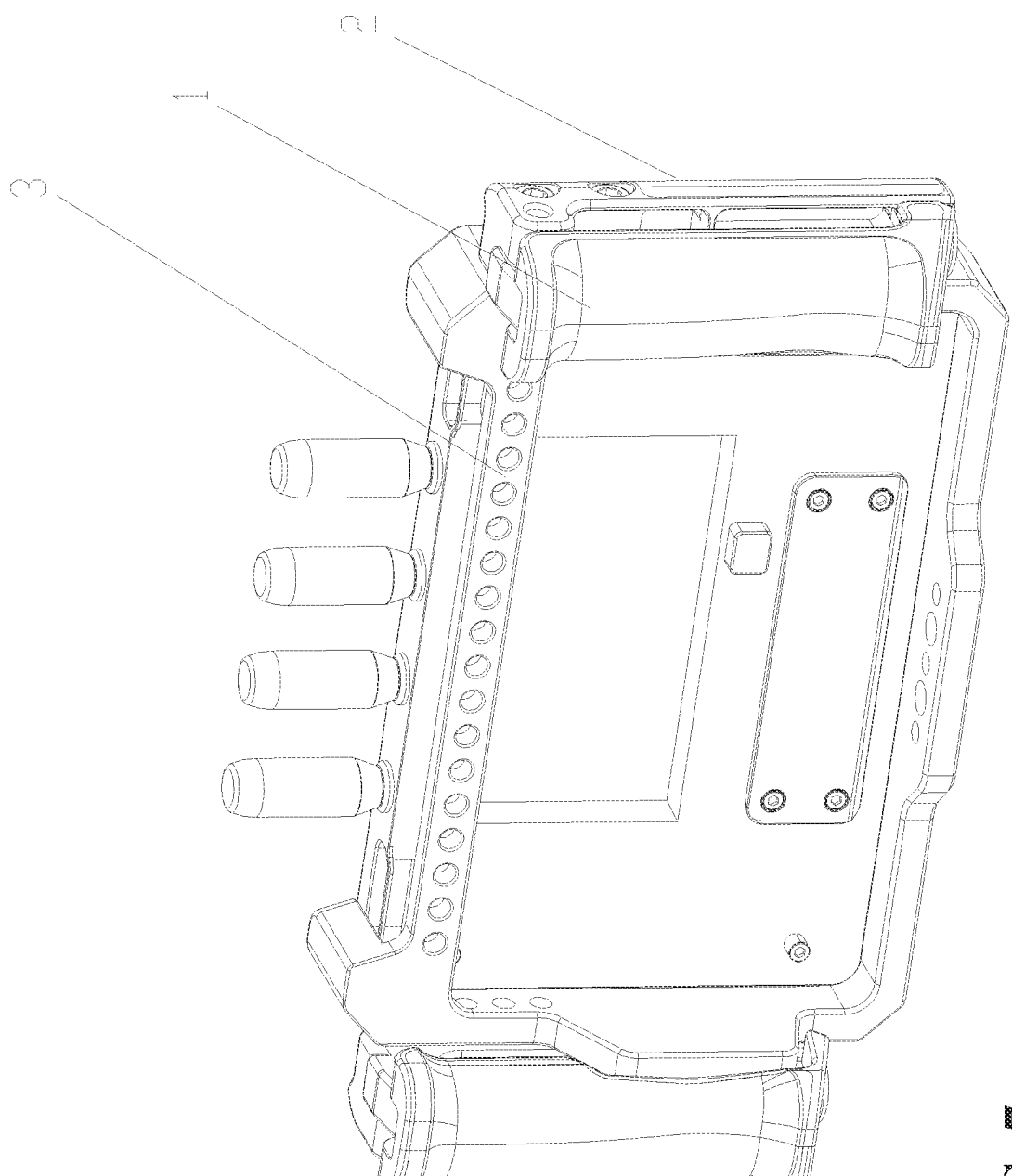
FIG. 7 is a structural schematic diagram of the handle mechanism mounted on an external photographic device after being folded.

Referring to FIGS. 1-7, a folding handle mechanism includes a front grip 1 and a rear grip 2. The rear grip 2 is hinged with the front grip 1, and the rear grip 2 is provided with a mounting assembly or mechanism for mounting the rear grip 2 on a side of a separate device (e.g., an external photographic device 3).

In one embodiment, a side surface of the rear grip 2 includes the mounting surface 21 to be fitted to the side surface of the external photographic device 3.

In one embodiment, the mounting assembly of the rear grip 2 includes one or more mounting screws 4. The mounting screw 4 can be movably (e.g., removably) provided on the rear grip 2 through threads, and one end of the mounting screw 4 penetrates the rear grip 2 to protrude from the mounting surface 21.

In one embodiment, a damping structure (e.g., one or more gaskets 6) is provided at the hinge of the rear grip 2 and the front grip 1.

In one embodiment, the handle mechanism further includes a hinge shaft 5 for forming the hinged connection between the front grip and the rear grip; a top end of a rear side of the rear grip 2 extends to form a rear grip hinge part 22, and the rear grip hinge part 22 is provided with a first hinge hole 221; a top end of a front side of the front grip 1 extends to form two front grip hinge parts 11, a hinge cavity 111 is formed between the two front grip hinge parts 11, each of the two front grip hinge parts 11 is provided with a second hinge hole 112, the rear grip hinge part 22 extends into (or received in) the hinge cavity 111, and the hinge shaft 5 sequentially penetrates the second hinge hole 112 of one of the two front grip hinge parts 11, the first hinge hole 221 of the rear grip hinge part 22 and the second hinge hole 112 of the other of the two front grip hinge parts 11; the damping structure may be a gasket 6, the gasket 6 is provided in the hinge cavity 111, and two sides of the gasket 6 are respectively abutted against a side of the rear grip hinge part 22 and a side of the front grip hinge part 11.

In one embodiment, two gaskets 6 (e.g., washers) are provided, and the hinge shaft 5 sequentially penetrates the second hinge hole 112 of one of the front grip hinge parts 11, one of the gaskets 6, the first hinge hole 221 of the rear grip hinge part 22, the other of the gaskets 6, and the second hinge hole 112 of the other of the front grip hinge parts 11. In one example, the hinge shaft 5 may be an I-shaped screw (e.g., see FIG. 4), and one end of the I-shaped screw is fixed with the second hinge hole 112 of the other front grip hinge part 11 through, for example, threads. The first hinge hole 221 of the rear grip hinge part 22 and the I-shaped screw may rotate relatively. Two sides (opposite sides) of one of the gaskets 6 are respectively abutted against the I-shaped screw and one side of the rear grip hinge part, and two sides of the other of the gaskets 6 are respectively abutted against the other side of the rear grip hinge part 22 and the side of the front grip hinge part 11.

In one embodiment, the rear surface of the front grip 1 is provided with a front grip rubber pad groove 12, a front grip rubber pad 121 is provided in the front grip rubber pad groove 12, the front surface of the rear grip 2 is provided with a rear grip rubber pad groove 231, and a rear grip rubber pad 23 is provided in the rear grip rubber pad groove 231.

In one embodiment, the front side of the front grip 1 is provided with an accommodating groove 13, and the rear side of the rear grip 2 is accommodated in the accommodating groove 13 when the rear grip 2 and the front grip 1 are rotated to be fitted together. In this case, the rear side of the rear grip 2 is received inside the accommodating groove 13.

While the above description contains many specific implementations of the disclosure, these should not be construed as limitations on the scope of the disclosure, but rather as examples of specific implementations thereof. Accordingly, the scope of the disclosure should be determined not by the implementations illustrated, but by the appended claims and their equivalents.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A folding handle mechanism, comprising:
   a first folding handle configured to be attached to an external photographic device; and
   a second folding handle configured to be attached to the external photographic device, the first folding handle and the second folding handled being respectively on opposite sides of the external photographic device,
   each of the first folding handle and the second folding handle comprises:
      a front grip; and
      a rear grip,
         wherein the rear grip is hinged with the front grip, and the rear grip is provided with a mounting assembly for mounting the rear grip on a side of an external photographic device.

2. The folding handle mechanism according to claim 1, wherein a side of the rear grip provides a mounting surface configured to be fitted to the side of the external photographic device.

3. The folding handle mechanism according to claim 2, wherein the mounting assembly comprises a mounting screw, the mounting screw is movably provided on the rear grip, and one end of the mounting screw penetrates the rear grip to protrude from the mounting surface.

4. The folding handle mechanism according to claim 1, wherein a damping structure is provided at a hinge between the rear grip and the front grip.

5. The folding handle mechanism according to claim 4, further comprising:
   a hinge shaft at the hinge between the front grip and the rear grip,
   wherein:
      a top end of a rear side of the rear grip extends to form a rear grip hinge part, and the rear grip hinge part is provided with a first hinge hole; and
      a top end of a front side of the front grip extends to form two front grip hinge parts, a hinge cavity is formed between the two front grip hinge parts, each of the two front grip hinge parts is provided with a second hinge hole, the rear grip hinge part extends into the hinge cavity, and the hinge shaft sequentially penetrates the second hinge hole of one of the two front grip hinge parts, the first hinge hole of the rear grip hinge part, and the second hinge hole of the other of the two front grip hinge parts; and
   wherein the damping structure comprises a gasket, the gasket is provided in the hinge cavity, and two sides of the gasket are respectively abutted against a side of the rear grip hinge part and a side of the front grip hinge part.

6. The folding handle mechanism according to claim 5, wherein the damping structure comprises two gaskets, and the hinge shaft sequentially penetrates the second hinge hole of one of the front grip hinge parts, one of the two gaskets, the first hinge hole of the rear grip hinge part, the other of the two gaskets, and the second hinge hole of the other of the front grip hinge parts.

7. The folding handle mechanism according to claim 1, wherein a first surface of the front grip is provided with a front grip rubber pad, and a second surface of the rear grip is provided with a rear grip rubber pad, the first surface and the second surface respectively facing opposite directions.

8. The folding handle mechanism according to claim 7, wherein a first side of the front grip is provided with an accommodating groove, and when the rear grip and the front grip are rotated relative to each other to be fitted together, a second side of the rear grip is accommodated in the accommodating groove.

* * * * *